(12) United States Patent
Iaremenko

(10) Patent No.: US 11,909,874 B2
(45) Date of Patent: Feb. 20, 2024

(54) SECURE CONFIDENTIAL USE OF COMMUNICATION SESSION KEYS

(71) Applicant: Hub data security Ltd., Tel Aviv (IL)

(72) Inventor: Andrey Iaremenko, Bat Yam (IL)

(73) Assignee: HUB DATA SECURITY LTD., Tel Aviv (IL)

( * ) Notice: Subject to any disclaimer, the term of this patent is extended or adjusted under 35 U.S.C. 154(b) by 278 days.

(21) Appl. No.: 17/454,051

(22) Filed: Nov. 8, 2021

(65) Prior Publication Data

US 2022/0150061 A1    May 12, 2022

Related U.S. Application Data

(60) Provisional application No. 63/111,616, filed on Nov. 9, 2020.

(51) Int. Cl.
    *H04L 9/08* (2006.01)
(52) U.S. Cl.
    CPC ............ *H04L 9/0861* (2013.01); *H04L 9/088* (2013.01)

(58) Field of Classification Search
    CPC ...... H04L 9/0861; H04L 9/088; H04L 9/0819
    See application file for complete search history.

(56) References Cited

U.S. PATENT DOCUMENTS

| | | | |
|---|---|---|---|
| 9,118,467 B2 * | 8/2015 | Maletsky | H04L 9/3268 |
| 11,502,827 B1 * | 11/2022 | Miller | H04L 9/083 |
| 11,502,834 B2 * | 11/2022 | Zee | H04L 9/0838 |
| 11,750,384 B2 * | 9/2023 | Ramadasse | H04L 9/3265 713/157 |
| 2017/0353319 A1 * | 12/2017 | Scarlata | G09C 1/00 |

* cited by examiner

*Primary Examiner* — Han Yang
(74) *Attorney, Agent, or Firm* — Reches Patents

(57) ABSTRACT

At least one non-transitory computer readable medium, that at least one non-transitory computer readable medium stores instructions for (a) generating master keys by a keys security entity (KSE) that is established within a KSE; (b) generating one-time connection session keys, by the KSE, based on the master keys; (c) outputting, by the KSE, the one-time connection session keys to a Connection Security Entity (CSE) enclave in which a CSE is established, over a secure communication link; and (d) preventing access, by the KSE, to the master keys.

19 Claims, 6 Drawing Sheets

SECURE CONFIDENTIAL USE OF COMMUNICATION SESSION KEYS

BACKGROUND

In today's online services and cloud computing oriented reality, the need to protect the connections from the edge devices (e.g. laptops, smartphones, cameras, cars, IoT) to the central cloud datacenters has become paramount concern for enterprises.

The strict and evolving privacy laws (e.g. GDPR) impose extremely high fines on exposure of any private information by mistake or by a hack into the system. One of the easiest way for hackers to get this information is on its way from the edge device to the protected cloud environment.

Current leading solution to this problem is the cryptographic key exchange algorithms, which enable the communicating parties to authenticate each other and to agree on the shared session encryption key without exposing it to the "man in the middle".

The whole process of trust between the parties is based on exchanging cryptographically signed certificate files, where all parties have trust in a single Root Certificate Authority. This Root CA should be extremely well protected from any attacks.

The weakness starts when this Root CA must delegate its authority to the secondary CA entities, which are installed in the datacenter cloud network and must be always connected to the internet to generate one-time session certificates.

The same entities are also executing the actual session authentication and encryption/decryption protocols and do so at huge scale of many millions of simultaneous connections. Thus, these entities are implemented in software on regular servers, which are wide open to remote and local cyber-attacks.

The secret private sessions' keys and certificates are kept in software on the same servers and open to theft by hackers, enabling them to listen and control the private secret data exchange between the edge devices and the cloud datacenter.

SUMMARY

There may be provided a method for secure communication, the method may include (a) generating master keys by a keys security entity (KSE) enclave that is established within a KSE; (b) generating one-time connection session keys, by the KSE enclave, based on the master keys; (c) outputting the one-time connection session keys to a Connection Security Entity (CSE) and/or a CSE enclave that is established within the CSE, over a secure communication link (secure may mean an encrypted link); and (d) preventing access, by the KSE enclave, to the master keys.

The method may include verifying, by the KSE enclave, a state of the CSE and/or CSE enclave; and preventing, by the KSE, sending a one-time connection session key to the CSE and/or CSE enclave when failing to verify that a state of the CSE and/or CSE enclave is not compromised.

The method may include periodically verifying, by the KSE, the state of the CSE enclave.

The method may include verifying, by the KSE, the state of the CSE and/or CSE enclave before sending to the CSE and/or CSE enclave at least some of the one-time connection session keys.

The method may include managing, by the CSE and/or CSE enclave, real time connections with multiple edge devices using the one-time connection session keys, and deleting, by the CSE and/or CSE enclave, each one-time connection session key at an end of a connection session to which the one-time connection session key is allocated.

The method wherein the CSE is a cloud-based software-based CSE of a datacenter.

The method may include requesting, by the CSE and/or CSE enclave and from the KSE, to provide a one-time connection session key for a connection session; providing to the CSE and/or CSE enclave the one-time connection session key; establishing, by the CSE and/or CSE enclave, a connection session using the one-time connection session key.

The method may include requesting the KSE enclave to provide a one-time connection session key for a connection session; verifying, by the KSE enclave, whether a state of the CSE and/or CSE enclave is non-compromised state; following a successful verifying, responding to the request.

There may be provided a system that may include a KSE enclave that may be established within a KSE. The KSE enclave may be configured to generate master keys and generate one-time connection session keys based on the master keys. The KSE and/or the KSE enclave may be configured to output the one-time connection session keys to a CSE and/or to a CSE enclave, over a secure communication link, and prevent access to the master keys.

There may be provided a non-transitory computer readable medium for secure communication, the non-transitory computer readable medium may store instructions for: (a) generating master keys by a keys security entity (KSE) enclave that is established within a KSE; (b) generating one-time connection session keys, by the KSE enclave, based on the master keys; (c) outputting the one-time connection session keys to a Connection Security Entity (CSE) and/or a CSE enclave that is established within the CSE, over a secure communication link; and (d) preventing access, by the KSE enclave, to the master keys.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
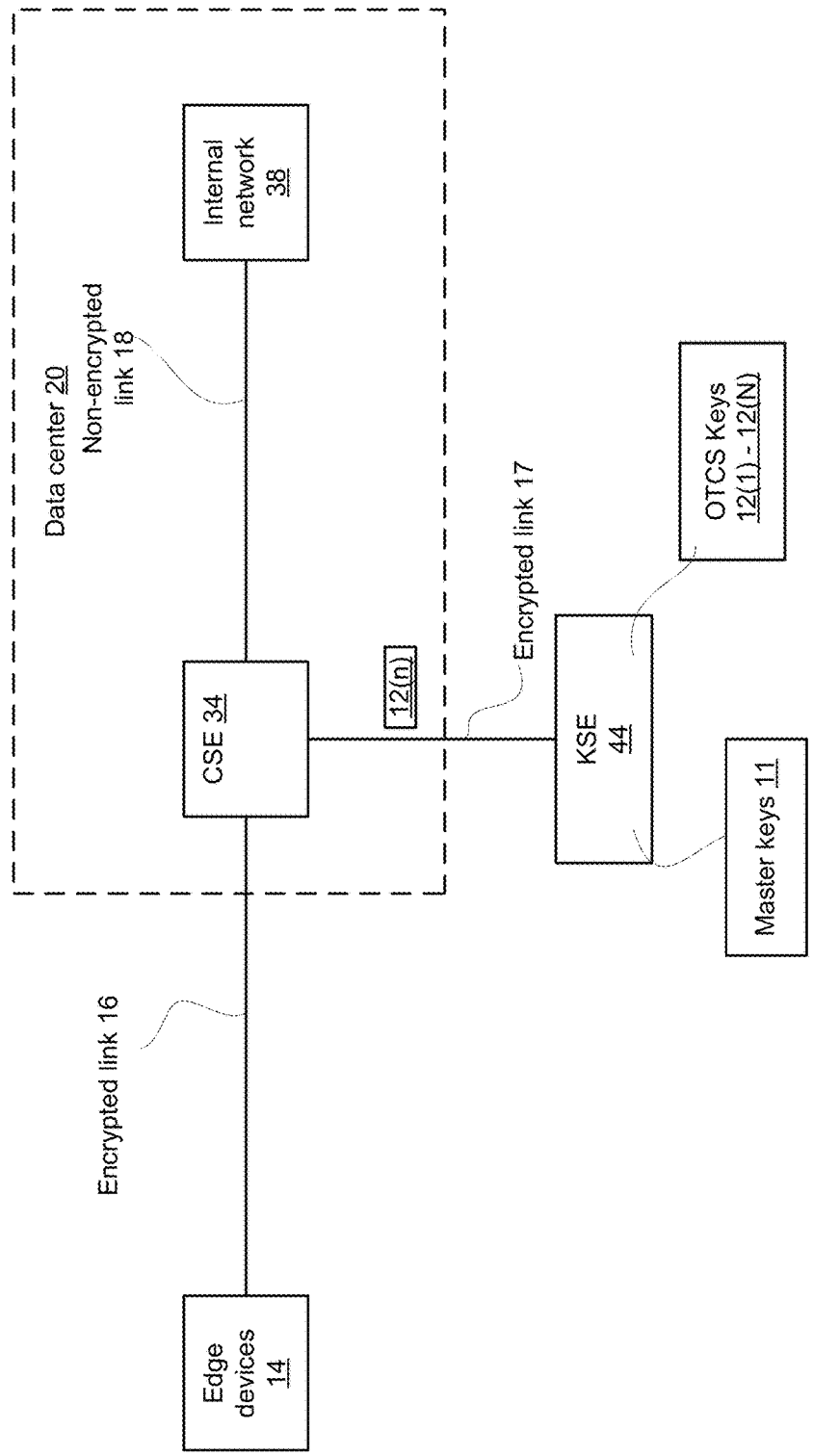
FIG. 1 is an example of a system.

Any reference to "may be" should also refer to "may not be".

In the following detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

The term "and/or" means additionally or alternatively. For example A and/or B means (a) only A, or (b) only B, or (c) A and B.

There may be provided a system, a non-transitory computer readable medium, and a method for secure confidential use of communication session keys.

The system, non-transitory computer readable medium, and method enable unique isolation of the secret keys and certificates, while minimizing the attack surface and keeping the extremely high throughput requirements of the data flow.

The KSE enclave may establish a secure link with the CSE enclave and/or otherwise communicate directly with the CSE enclave—even without involving the KSE and/or the CSE. The same applies to the CSE enclave. The KSE and the CSE may communicate with each other or may communicate via a secured link between the KSE enclave and the CSE enclave.

The KSE and/or KSE enclave may condition the sending of responses to the CSE and/or CSE enclave based on the state of the CSE and/or CSE enclave.

The KSE enclave may communicate with the CSE enclave via the KSE and/or the CSE.

FIG. 1 illustrates an example of edge devices 14, datacenter 20 and a KSE 44.

An edge device may be, for example, any type of computerized system such as desktop, mobile phone, electronic wallet, wearable computer, laptop.

Any edge device may participate in an encrypted communication with a datacenter.

Edge devices 14 communicate over one or more encrypted link 16 with the edge devices. The datacenter 20 includes CSE 34 and internal network 38 (or any other resources of the datacenter 20).

CSE 34 may communicate with the internal network 38 over non-encrypted link 18. KSE 44 is illustrates as storing master keys 11 and one time communication session (OTCS) keys 12(1)-12(N), N being a positive integer. The value of N may differ over time, may be determined in any manner, and the like.

The CSE may hold one or more current active OTSC keys (one OTCS key per current communication session) and performs authentication and encryption/decryption activities required to secure the one or more per current communication session—using the one or more current active OTSC keys.

The OTCS keys may be generated at any time, according to any schedule, according to any event, and the like. The generation of one or more OTCS keys may be triggered by receiving a request to generate the one or more OTSC keys (for example when the CSE intends to participate in one or more communication sessions. The generation of one or more OTCS keys may be triggered regardless of requests arriving outside the KSE.

FIG. 1 also illustrates a certain OTSC key 12(1) generated by KSE and sent to CSE 34.

The KSE 44 may include a separate isolated high security hardware entity (such as a KSE enclave) which can be in any physical location, for example—as required by the customer. The isolated high security hardware entity may protect the keys and additional sensitive information—and may be a KSE enclave (not shown).

The KSE may be in communication with the CSE. The CSE may be an online cloud-based software-CSE, that may be configured to manage the real-time connections with the edge devices 14.

The CSE may request the OTCS key for a specific connection session from the KSE, keep this OTCS key (without having access to other cryptographic information such as the masker keys) for the duration of the specific connection session. The OTCS key becomes irrelevant and discarded upon closing the specific connection session.

When this solution is applied, an attacker can only get a OTCS key for the specific connection session, and will not be able to get access to past or future OTCS keys for previous connections session or next connection sessions accordingly—and cannot access any master key.

Figure 2:
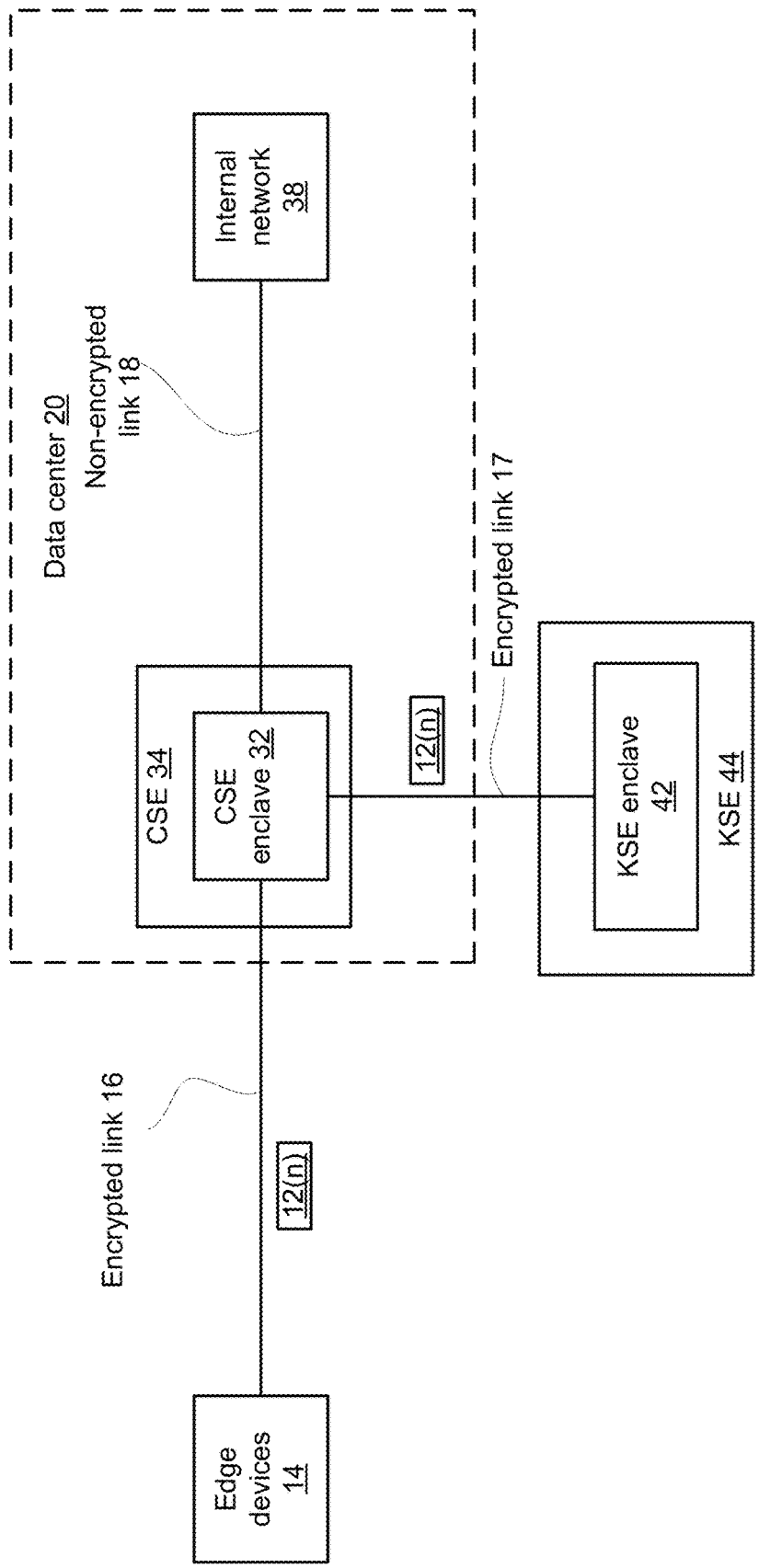
FIG. 2 is an example of a system.

FIG. 2 illustrates an example of edge devices 14, datacenter 20 and a KSE enclave 42 within a KSE 44. A CSE enclave 32 of the datacenter 20 is within the CSE 34.

The CSE may include a CSE enclave or any other means for providing isolation by hardware, software, or a combination of them. FIG. 2 illustrates that the isolation may be implemented by the CSE enclave 32.

The KSE 44 may include a KSE enclave 42 or any other means for providing isolation by hardware, software, or a combination of them. FIG. 2 illustrates that the isolation may be implemented by the KSE enclave 42.

The CSE enclave may hold current active communication sessions secret keys (one time key per current communication session) and performs the authentication and encryption/decryption activities.

The interface between the CSE and the CSE enclave can be of many types of implementations (e.g. shared memory, shared files, PCIE, LAN). The CSE enclave may have a direct encrypted and authenticated connection to the KSE, where the connection is fully secure and encrypted from the CSE itself.

The KSE enclave is a physically separate entity, which holds master keys and certificates in its own secure enclave—the KSE. The master keys may be generated inside the KSE enclave and cannot be read out of the KSE enclave, making them inaccessible to everyone.

The master keys can be used (for example—only) to generate the OTSC keys—for example upon specific requests from the CSE.

A single KSE enclave can service multiple CSEs.

A single CSE can use multiple KSE enclaves.

The master key generation inside the KSE enclave may use one or more deterministic algorithms, so each new child key is guaranteed to be unique and different from all previous or future child keys. The KSE enclave may hold only any number of master keys—for example—a small number such as 1 to 10, which can be easily protected inside the secure enclave of the KSE enclave.

Additionally, KSE enclave may enforce periodic request to the CSE for feedback about the state of the CSE and/or the state of the CSE enclave. The KSE enclave will automatically disconnect from the CSE on the event of incorrect response or lack of response.

The KSE may check the state of the CSE enclave and/or the state of the CSE periodically by sending state info requests to the CSE enclave (and/or the CSE) and saving the response in the historical log of all responses. Lack of response from CSE enclave (and/or the CSE) in the allotted period of time constitutes a problem and reason for immediate disconnect.

The CSE enclave can optionally check the state of CSE internally and forward the CSE state info as part of CSE enclave info response to the KSE.

The KSE enclave may designate the CSE enclave as compromised and stop sending it new child keys. This procedure prevents continuous operation of a compromised CSE enclave.

There is provided a solution in which the master keys are physically separated from the CSE in the distinct standalone KSE enclave.

There is provided a solution that includes using a small set of master keys on a separate entity to generate deterministically the one-time child keys on demand and share only the current child keys to the CSE in a secure manner.

There is provided a solution that includes tamper monitoring of the CSE and/or of the CSE enclave, the monitoring is executed by the KSE and automated disconnection of compromised CSE from the KSE enclave.

Figure 3:
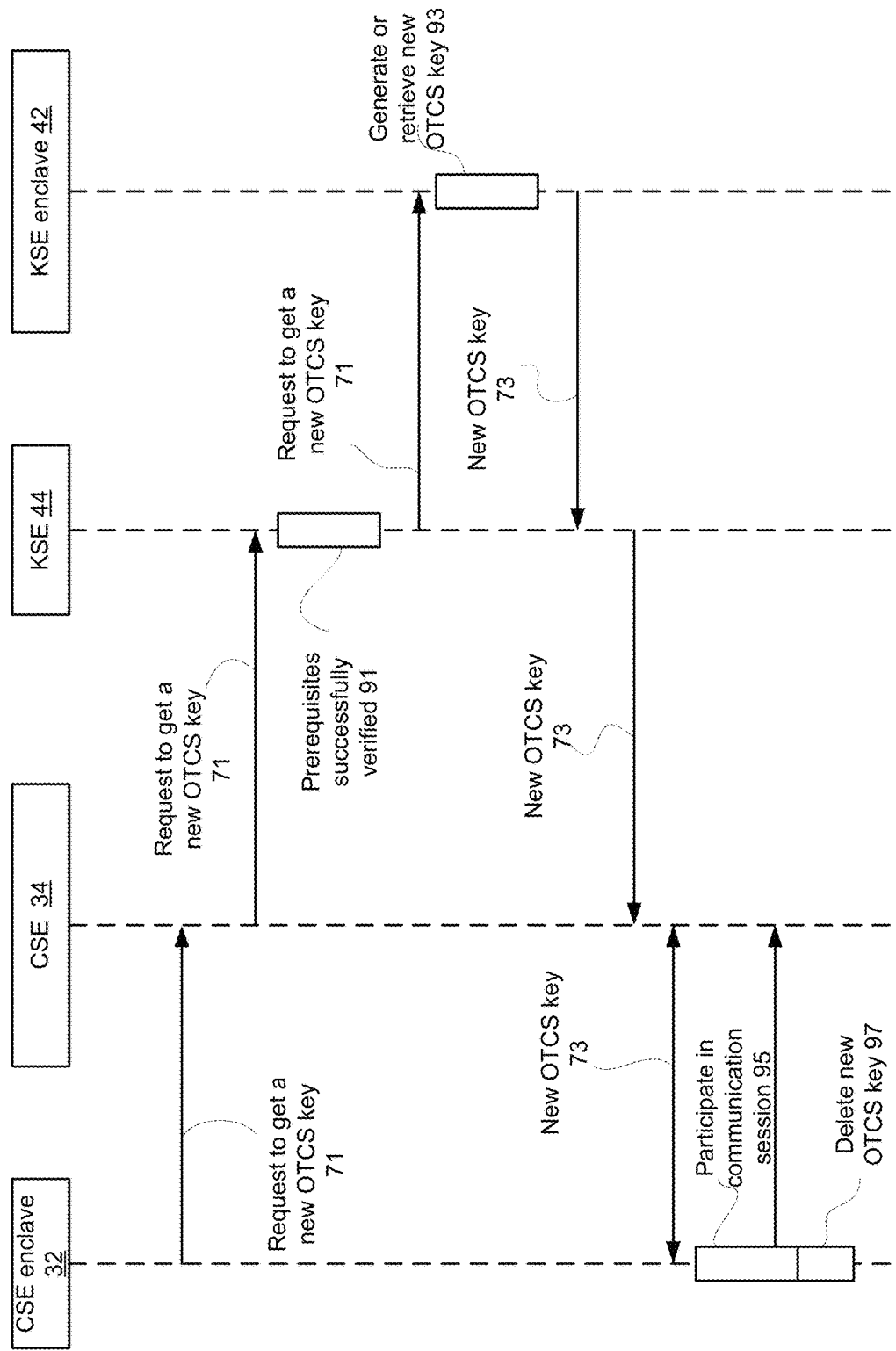
FIG. 3 is an example of a process.

FIG. 3 illustrate a successful process in which a new OTCS key is requested, provided, used during a communication session and is deleted.

The process includes:
a. CSE enclave 32 send to CSE 34 a request (71) to get a new OTSC key.
b. CSE 34 sends request 71 to KSE 44.
c. KSE 44 tries (91) to verify that prerequisites were fulfilled—for example verifies the integrity of the request and/or verifies that the CSE state (or the CSE enclave state) is non-compromised. The verification may require assistance from the KSE enclave.
d. Assuming that the verification succeeded—KSE 44 sends the request 71 to KSE enclave 42.
e. KSE enclave 42 generates or retrieves the new OTSC key 73.
f. KSE enclave 42 sends the new OTSC key 73 to the KSE 44.
g. KSE 44 sends the new OTSC key 73 to the CSE enclave 32 and/or to the CES 34 that in turn may send it to the CSE enclave 32.
h. CSE enclave 42 participates (95) in a communication session (using the new OTCS key)—and deletes (97) the new OTCS key when the session ends.

Examples of verification methods include:
a. Collection of physical parameters measurements from the KSE (temperature, CPU load, network actual throughput, movement sensors, disk data rates read and write) and comparing them to historical data logs. Anomalies beyond some threshold will trigger error.
b. Request integrity can be verified using cryptographic functions, such as HMAC, ECDSA, RSA, by validating the cryptographic signature coming with the request against prior known reference (shared secret or public certificate).
c. Request integrity can also be verified by comparing the actual incoming byte array to the reference request template (total length, specific fields values).

Figure 4:
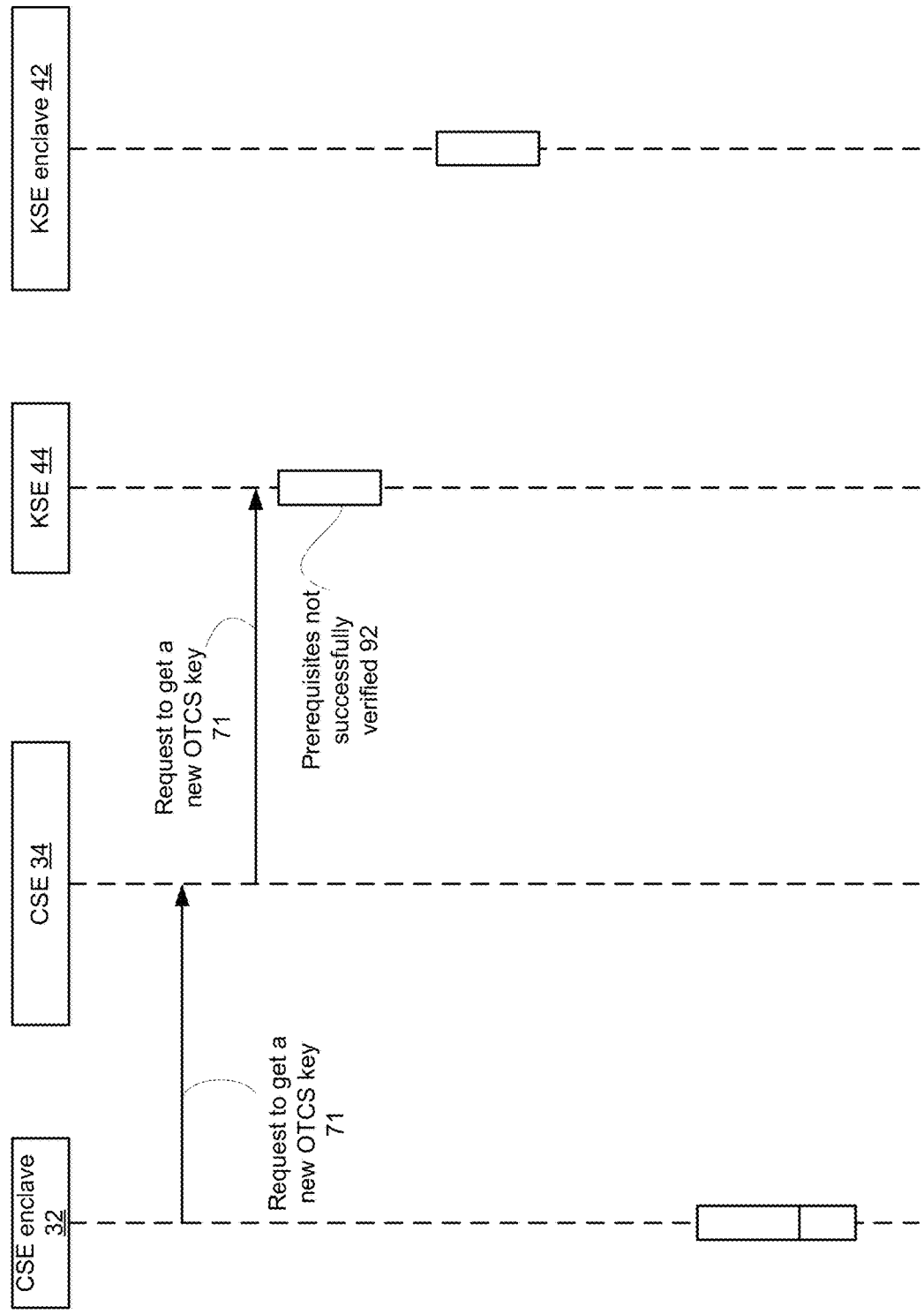
FIG. 4 is an example of a process.

FIG. 4 illustrate a failed process in which a new OTCS key is requested but not provided.

The process includes:
a. CSE enclave 32 send to CSE 34 a request (71) to get a new OTSC key.
b. CSE 34 sends request 71 to KSE 44.
c. KSE 44 fails (92) to verify that the prerequisites were fulfilled—and no new OTSC is provided.

Figure 5:
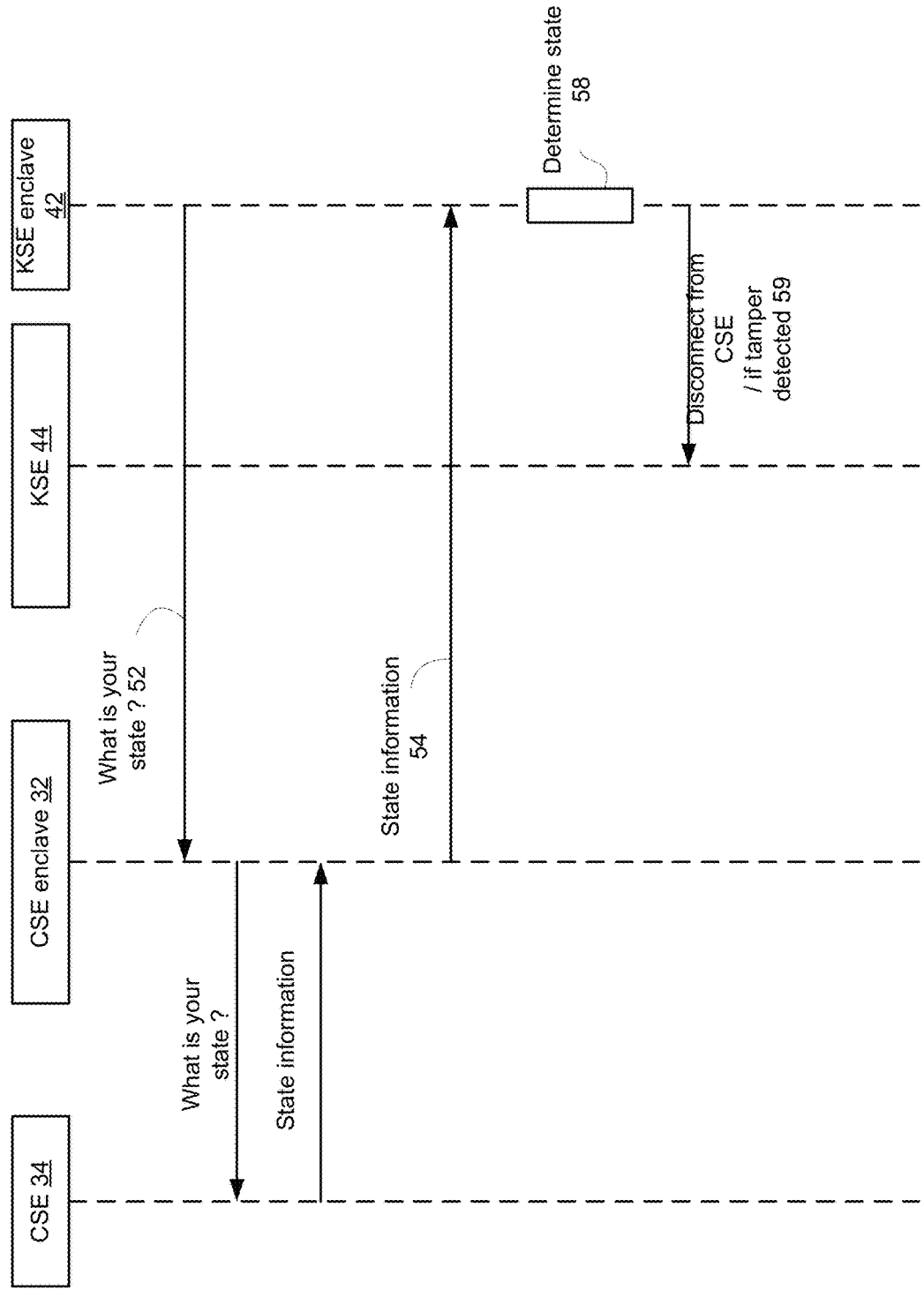
FIG. 5 is an example of a process.

FIG. 5 illustrate a process in which a the state of the CSE is checked.

The process includes:
a. KSE enclave 42 sends a state request (52) to the CSE enclave 32.
b. The CSE enclave 32 asks the CSE 34 for the state of the CSE.
c. The CSE 34 provided state information to the CSE enclave 32.
d. The CSE enclave sends (54) the state information to the KSE enclave 42.
e. The KSE enclave 42 determines (58) the state based on the current state information and/or previous state information.
f. The KSE enclave requests (59) the KSE 44 to disconnect from the CSE if tamper is detected.

Figure 6:
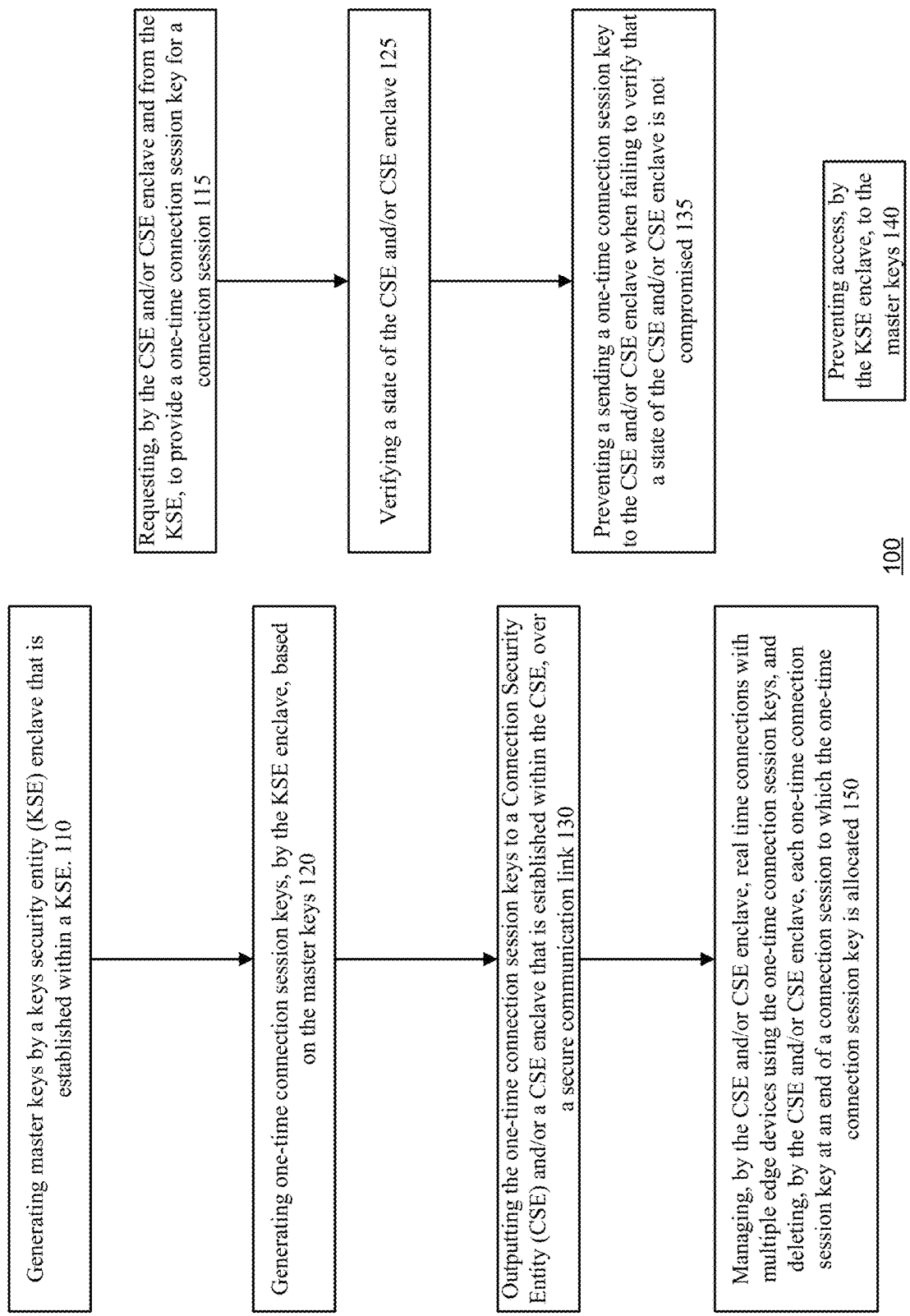
FIG. 6 is n example of a method.

FIG. 6 illustrates method 100.

Method 100 may include step 110 of generating master keys by a keys security entity (KSE) enclave that is established within a KSE.

Step 110 may be followed by step 120 of generating one-time connection session keys, by the KSE enclave, based on the master keys.

Step 120 may be followed by step 130 of outputting the one-time connection session keys to a Connection Security Entity (CSE) and/or a CSE enclave that is established within the CSE, over a secure communication link.

Step 130 may be followed by step 150 of managing, by the CSE and/or CSE enclave, real time connections with multiple edge devices using the one-time connection session keys, and deleting, by the CSE and/or CSE enclave, each one-time connection session key at an end of a connection session to which the one-time connection session key is allocated.

Method 100 may also include step 140 of preventing access, by the KSE enclave, to the master keys. Step 140 may be during the entire execution of method 100—for example in parallel to and/or before and/after any of any other steps of method 100.

Method 100 may include a sequence of steps 115, 125 and 135.

Step 115 may include requesting, by the CSE and/or CSE enclave and from the KSE, to provide a one-time connection session key for a connection session.

Step 125 may include verifying a state of the CSE and/or CSE enclave.

Step 135 may include preventing a sending a one-time connection session key to the CSE and/or CSE enclave when failing to verify that a state of the CSE and/or CSE enclave is not compromised.

The verifying may be executed regardless of a request—and can be done periodically, randomly, pseudo-randomly, and the like.

Steps 125 and/or 125 may be executed by the KSE enclave and/or the KSE.

Method 100 may include (a) requesting, by the CSE and/or CSE enclave and from the KSE, to provide a one-time connection session key for a connection session; (b) providing to the CSE and/or CSE enclave the one-time connection session key; and (c) establishing, by the CSE and/or CSE enclave, a connection session using the one-time connection session key.

Method 100 may include (a) requesting the KSE enclave to provide a one-time connection session key for a connection session; (b) verifying, by the KSE enclave, whether a state of the CSE and/or CSE enclave is non-compromised state; and (c) following a successful verifying, responding to the request.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for secure communication, the method comprises:
    generating master keys by a keys security entity (KSE) enclave that is established within a KSE;
    generating one-time connection session keys, by the KSE enclave, based on the master keys;
    outputting the one-time connection session keys to a Connection Security Entity (CSE) and/or a CSE enclave that is established within the CSE, over a secure communication link; and
    preventing access, by the KSE enclave, to the master keys.

2. The method according to claim 1 comprising:
    verifying, by the KSE enclave, a state of the CSE and/or CSE enclave; and
    preventing a sending a one-time connection session key to the CSE and/or CSE enclave when failing to verify that a state of the CSE and/or CSE enclave is not compromised.

3. The method according to claim 2 comprising periodically verifying the state of the CSE enclave.

4. The method according to claim 2 comprising verifying the state of the CSE and/or CSE enclave before sending to the CSE and/or CSE enclave at least some of the one-time connection session keys.

5. The method according to claim 1 comprising:
    managing, by the CSE and/or CSE enclave, real time connections with multiple edge devices using the one-time connection session keys, and
    deleting, by the CSE and/or CSE enclave, each one-time connection session key at an end of a connection session to which the one-time connection session key is allocated.

6. The method according to claim 1 wherein the CSE is a cloud-based software-based CSE of a datacenter.

7. The method according to claim 1 comprising:
    requesting, by the CSE and/or CSE enclave and from the KSE, to provide a one-time connection session key for a connection session;
    providing to the CSE and/or CSE enclave the one-time connection session key;
    establishing, by the CSE and/or CSE enclave, a connection session using the one-time connection session key.

8. The method according to claim 1 comprising:
    requesting the KSE enclave to provide a one-time connection session key for a connection session;
    verifying, by the KSE enclave, whether a state of the CSE and/or CSE enclave is non-compromised state;
    following a successful verifying, responding to the request.

9. A non-transitory computer readable medium for secure communication, the non-transitory computer readable medium comprises:
    generating master keys by a keys security entity (KSE) enclave that is established within a KSE;
    generating one-time connection session keys, by the KSE enclave, based on the master keys;
    outputting the one-time connection session keys to a Connection Security Entity (CSE) and/or a CSE enclave that is established within the CSE, over a secure communication link; and
    preventing access, by the KSE enclave, to the master keys.

10. The non-transitory computer readable medium according to claim 9 that stores instructions for:
    verifying, by the KSE enclave, a state of the CSE and/or CSE enclave; and
    preventing a sending a one-time connection session key to the CSE and/or CSE enclave when failing to verify that a state of the CSE and/or CSE enclave is not compromised.

11. The non-transitory computer readable medium according to claim 10 that stores instructions for periodically verifying the state of the CSE enclave.

12. The non-transitory computer readable medium according to claim 10 that stores instructions for verifying the state of the CSE and/or CSE enclave before sending to the CSE and/or CSE enclave at least some of the one-time connection session keys.

13. The non-transitory computer readable medium according to claim 9 that stores instructions for:
    managing, by the CSE and/or CSE enclave, real time connections with multiple edge devices using the one-time connection session keys, and
    deleting, by the CSE and/or CSE enclave, each one-time connection session key at an end of a connection session to which the one-time connection session key is allocated.

14. The non-transitory computer readable medium according to claim 9 wherein the CSE is a cloud-based software-based CSE of a datacenter.

15. The non-transitory computer readable medium according to claim 9 that stores instructions for:
    requesting, by the CSE and/or CSE enclave and from the KSE, to provide a one-time connection session key for a connection session;
    providing to the CSE and/or CSE enclave the one-time connection session key;
    establishing, by the CSE and/or CSE enclave, a connection session using the one-time connection session key.

16. The non-transitory computer readable medium according to claim 9 that stores instructions for:
    requesting the KSE enclave to provide a one-time connection session key for a connection session;
    verifying whether a state of the CSE and/or CSE enclave is non-compromised state;
    following a successful verifying, responding to the request.

17. A system for secure communication, the system comprises:
    a keys security entity (KSE) enclave that is established in a KSE, the KSE enclave is configured to (a) generate master keys, (b) generate one-time connection session keys, by the KSE enclave, based on the master keys, (c) output the one-time connection session keys to a Connection Security Entity (CSE) and/or a CSE enclave that is established within the CSE, over a secure communication link; and (d) prevent access, by the KSE enclave, to the master keys.

18. The system according to claim 17 comprising the CSE and the CSE enclave.

19. The system according to claim 17 wherein the KSE enclave is configured to verify a state of the CSE and/or CSE enclave; and wherein the system is configured to prevent a sending a one-time connection session key to the CSE and/or CSE enclave when failing to verify that a state of the CSE and/or CSE enclave is not compromised.

* * * * *